Figure 1:
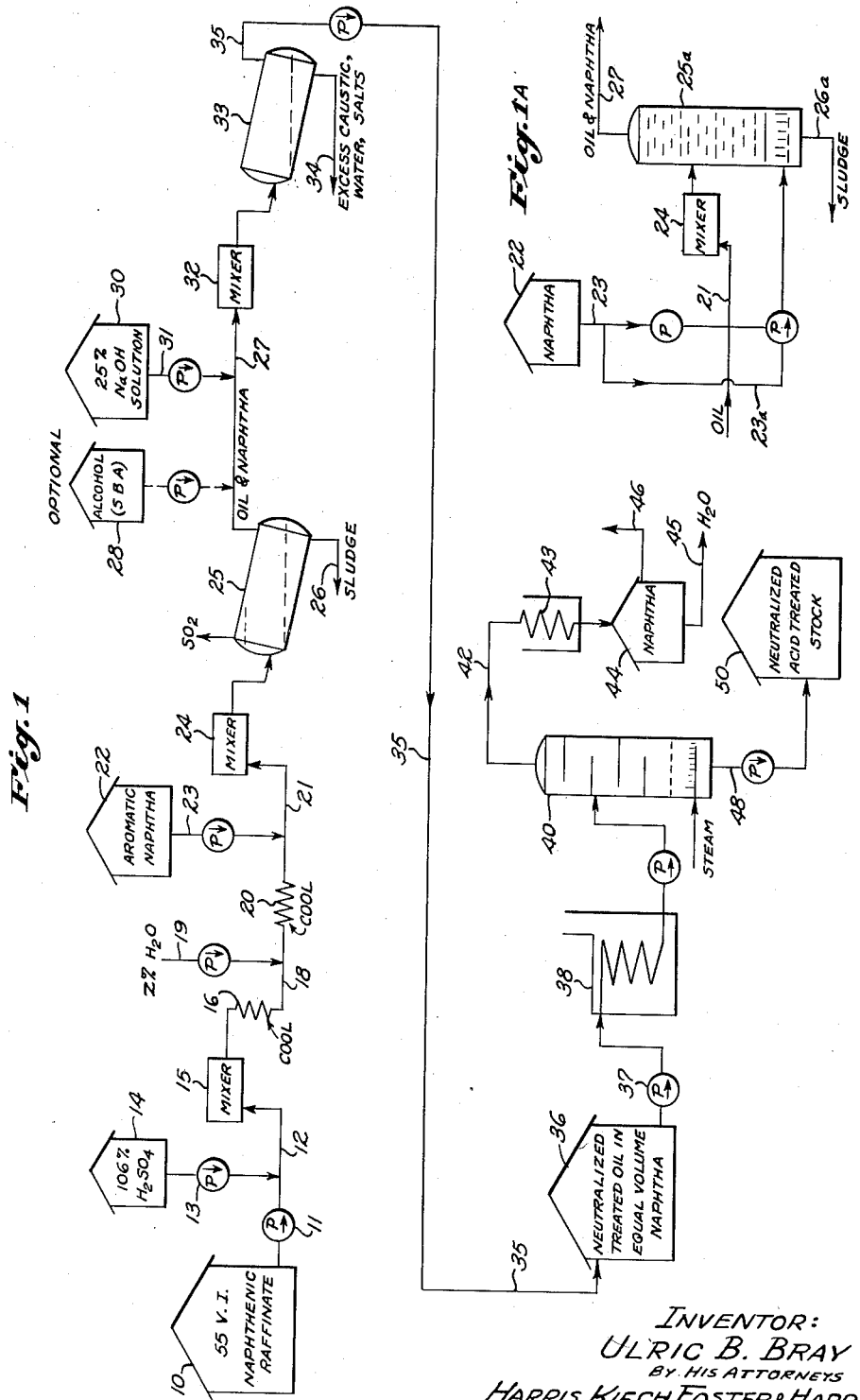

United States Patent Office 2,732,344
Patented Jan. 24, 1956

2,732,344

METHOD FOR PRODUCING NEUTRALIZED ACID-TREATED OIL AND RECOVERING MOTOR OIL STOCK AND SULFONATES

Ulric B. Bray, Pasadena, Calif., assignor to Bray Oil Company, Los Angeles, Calif., a limited partnership Application October 27, 1951, Serial No. 253,529

17 Claims. (Cl. 252—33)

This invention relates to the acid treatment of petroleum oils, such as the lubricating oil type, and the recovery of motor oil stocks and sulfonates and the like as primary or incidental products.

An object of the invention is to provide a novel and valuable method for the acid treatment of oils which have previously been treated to remove the bulk of polymerizable materials therein, such novel treatment providing especially for the efficient settling of sludge following treatment of such oils with fuming sulfuric acid, whereby to obtain a preferred oil fraction and to reject in the sludge objectionable constituents which would otherwise carry over into the oil fraction.

More specifically it is an object of the invention to provide a treating method employing fuming sulfuric acid whereby the objectionable "green sulfonic acids" commonly carried over into the separated oil fraction are more completely rejected in the sludge so that the sulfonic acids in the recovered oil fraction are very largely the more desirable mahogany sulfonic acids.

It is a further object of the invention to reduce the loss of valuable oil and desirable mahogany sulfonic acids to sludge, thereby obtaining increased yield of treated oil and desirable sulfonic acids.

It is also an object of the invention to provide a novel process for the recovery of substantially pure oil-soluble sulfonates dissolved in oil with almost complete freedom from water-soluble sulfonates, that is, salts of the above-indicated green sulfonic acids. It is more particularly an object of the invention to obtain a concentrate in oil of polyvalent metal salts of the above-mentioned mahogany sulfonic acids with almost complete freedom from salts of the mentioned green sulfonic acids and from inorganic salts such as sulfates, sulfites, and chlorides, for example sodium sulfates, sulfites, and chlorides.

Other objects of the invention, together with various features thereof will become apparent to those skilled in the art upon reference to the following specification and the accompanying flow sheet wherein certain embodiments of the invention are set forth.

In practicing the present invention, according to one embodiment, I may employ as a starting material a naphthenic raffinate which has been previously treated to remove the greater portion of polymerizable constituents therein, so as to yield for example an oil having a viscosity index of about 45. During the present treatment, this index will be improved, for example to an index of about 57. In treating such an oil according to this improvement, there is intimately mixed therewith a quantity of fuming sulfuric acid in the ratio of 2 to 3 pounds of fuming sulfuric acid to each gallon of oil being treated. Such an acid may contain about 25% oleum, which may be otherwise termed 106% $H_2SO_4$. Sulfonation takes place quite rapidly after admixture of the acid, starting with both oil and acid at 60° F. to 75° F. and reaching a temperature of 120° F. to 135° F. during the reaction. The mixture is then cooled to a temperature of 95° F. to 110° F., following which about 1% or 2% of water is mixed with the acid oil, if desired, whereby to facilitate subsequent sludge separation. The resultant acid oil, with or without the indicated 1% or 2% of added water, having been cooled to a temperature of about 95° F. to 110° F. is then mixed with an equal part of naphtha, of a character described below. This naphtha may be introduced into the acid oil in one treatment, or it may be divided, half of it being introduced into the oil which is passed to a separator, and the other half being used to wash the sludge, as by countercurrent treatment.

In either event the acid sludge separates readily from the oil phase, the fine pepper sludge coming down completely and taking with it almost all of the green sulfonic acids which are commonly quite difficult to eliminate from the oil phase.

It is to be noted that the dilution of the acid oil with the indicated equal parts of naphtha takes place immediately following the admixture of the acid and accompanying cooling, such dilution being brought about before sludge separation.

Following sludge separation the naphtha solution of the acid treated oil is then neutralized, preferably with sodium hydroxide. This is effected by commingling with the naphtha solution of the acid treated oil a water solution of sodium hydroxide in quantity sufficient to neutralize all acidic bodies remaining in the oil. The strength of the sodium hydroxide solution is conveniently from 5% to 40% by weight. The naphtha solution and aqueous alkali are mixed by suitable agitation until reaction is complete. The neutralized mixture is then allowed to settle in an appropriate separating vessel so that excess caustic solution, water, and contained salts will drop out.

The neutralized, treated oil in naphtha solution is then treated to distill off the naphtha and any accompanying moisture. The naphtha, which may be removed by steam distillation, is then recovered for further use, and the neutralized, acid-treated oil recovered is ready for purification treatment to recover motor oil stock, sulfonates and the like.

With respect to the starting material, above identified as 45 V. I. naphthenic raffinate, this may in practice be any other appropriate stock such as available 25 V. I. or 55 V. I. naphthenic raffinate, and these may have been produced by any appropriate process, such as treatment with sulfuric acid of 93% to 98% strength, or by solvent extraction or the like, to remove readily polymerizable materials.

With respect to the naphtha employed to dilute the freshly treated oil for facilitation of sludge separation, this preferably is either largely or entirely aromatic. Thus, the naphtha may be benzene, toluene, xylene, or mixtures of these and related aromatics, along with a minor proportion of naphthenes and paraffins. While "straight run" or largely paraffinic naphthas may be used in larger ratios, I have found that less of the aromatic type naphtha is required to give an equivalent result as regards sludge separation and recovery of desired products. In practice I have employed a "hydroformed" naphtha containing about 70% of aromatics consisting largely of xylenes and ethyl benzene, about 15% of naphthenes, and about 15% of paraffins. Such material has a gravity of 35.1° A. P. I. at 60° F., an open cup flash point of 80° F. and a boiling range of about 265° F. to 290° F. This could have a lower boiling range, for example possibly as low as 100° F. and running up to about 300° F. However, it should not exceed 300° F. in order to avoid danger of decomposing the sulfonates in the oil when the naphtha is stripped off the neutralized, acid-treated oil. Very desirably such naphtha is a narrow cut having a narrow boiling range such as 265° F. to 290° F. as above indicated. This greatly facilitates its removal from the oil and sulfonate phase by distillation.

It is also possible to employ a naphtha which is very largely naphthenic in character, but the aromatic type, or largely aromatic type, above indicated is very much preferred. Again, the amount of naphtha employed may be varied considerably. For example about one-half volume of naphtha may be used with one volume of oil, or up to two to three volumes of naphtha may be employed with one volume of the acid-treated oil. However, the previously indicated treatment of one volume of acid-treated oil containing all sludge and unreacted acid with about one volume of the naphtha described has been selected as a practical ratio for commercial operation. Such a proportion results in efficient pepper sludge separation and is conducive to economical recovery of the naphtha.

The amount of fuming sulfuric acid (25% oleum) used will vary with the nature of the stock, particularly as related to the proportion of the stock which will react with the oleum. As indicated above, the stock will have preferably been subjected to appropriate pretreatment to remove those constituents which react readily with sulfuric acid to produce polymerized, heavy sludges. A fair criterion of pretreatment is generally that the pretreated stock shall show less than 8% loss to sludge on treating with 25% by weight of 93% strength sulfuric acid at 100° F. While this is not a necessary part of the invention described herein, it does permit a conservation of oleum and reduces the amount of sludge to be handled in a final or sulfonation operation described herein. In general, the more severe the pretreatment, the less oleum is required, but beyond a certain point in the pretreatment, the yield of sulfonic acids on treatment with oleum will decrease. As examples, a viscous distillate from San Joaquin Valley, California, naphthenic crude which gave a finished "unsulfonatable" oil of about 430 seconds S. U. viscosity at 100° F. was extracted with furfural in varying amounts to give raffinates of 25 V. I., 45 V. I., 55 V. I., and 65 V. I., respectively. Each of these raffinates was reacted with excess oleum in accordance with this invention, the 25 V. I. stock receiving 3.3 pounds oleum per gallon, the 45 V. I. stock receiving 2.6 pounds per gallon, the 55 V. I. stock receiving 2.1 pounds per gallon, and the 65 V. I. stock receiving 1.5 pounds per gallon. As expected, the least loss to sludge was experienced with the 65 V. I. stock, but less than 5% mahogany sulfonates were present in the recovered neutralized oil. The greatest loss to sludge was experienced with the 25 V. I. stock but the recovered neutralized oil contained 21% mahogany sulfonates. Similarly, the 45 V. I. and 55 V. I. stocks, respectively, gave intermediate yields of sludge and sulfonates.

The acid-treated, neutralized petroleum oil recovered from the distillation of the naphtha therefrom characteristically has a composition which, for example, is about as follows:

100 parts by weight of sulfonate
420 parts by weight of oil
4 parts by weight of salts (inorganic)
6 parts by weight of water These parts will vary considerably from stock to stock, but those indicated are typical and fairly representative of stocks which may be treated by this process. The sulfonates are primarily sodium mahogany sulfonates, but they may contain a limited amount of sodium green acid sulfonates, although the proportion of these sulfonates is very much less than that characteristically encountered in the crude sulfonate-in-oil of commerce.

This neutralized, acid-treated oil is now treated for the purpose primarily of recovering a desirable motor oil stock, and of eliminating all objectionable proportions of water, salts, and green acid sulfonates, and of separating desirable quantities of sulfonate-free oil from oil containing the sulfonate.

This process of separating oil and purifying the sulfonates primarily consists of dissolving the oil and indicated constituents in an organic solvent which is readily oil-soluble and relatively water-insoluble, such solvent containing between about 4 to 8 carbon atoms per molecule, being a good solvent for mahogany sulfonates, being a good emulsion-breaking liquid, and boiling below about 400° F. Such a solvent which I have used very satisfactorily for this purpose is secondary butyl alcohol. Other solvents are butyl alcohol, hexyl alcohols, methyl isobutyl carbinol, and the amyl alcohols such as isoamyl alcohol. In general any oil-soluble, relatively water-insoluble organic liquid consisting of carbon, hydrogen and oxygen and boiling not materially in excess of 400° F. is suitable. Examples of these are the heptanols, the octanols and other emulsion-breaking liquids like isopropyl acetate, isobutyl acetate, isopropyl ether and methyl isobutyl ketone.

The emulsion-breaking liquid, such as secondary butyl alcohol, is used in the order of about 5 parts to 20 parts for each 100 parts of a sulfonate-containing oil, about 8 to 10 parts being used in practice in most instances. Where the term "alcohol" or the term "secondary butyl alcohol" is used, it is intended to the indicative also of any of the other oil-soluble, relatively water-insoluble organic emulsion-breaking liquids heretofore defined. Also, where the term "alcohol" is used in referring to specific procedures indicated, it is primarily significant of the secondary butyl alcohol which I have used in practice, although it is not intended to be limited thereto. Also, the term "soap" may sometimes be used to indicate the sulfonate being handled, which may be either the water-soluble sodium sulfonate, or water-insoluble calcium sulfonate or sulfonic acid salt of other appropriate polyvalent metal. The term "soap" may be significant of both the green acid sulfonates and the mahogany sulfonates, as the specific circumstance may indicate.

The neutralized acid-treated oil, in which the sulfonates are now present as sodium sulfonates, after being freed from the naphtha as above described, contains a very limited amount of the green acid sulfonates as well as the large indicated proportion of mahogany sulfonates. For example, of the 100 parts of sulfonate in 420 parts of oil as above given, about 3 parts of the 100 parts of sulfonate may be green acid sulfonate. It is desired to eliminate substantially all of such green acid sulfonate as well as substantially all of the indicated 4 parts of inorganic salts (principally sodium sulfate). In the first stage of elimination of these materials, the oil stock together with the 8 to 10 parts of alcohol for each 100 parts of the oil stock is commingled with an adequate but limited amount of water, such as ordinary tap water or water of equivalent purity. The amount of water is about 15% to 25% of the volume of the oil stock. If desired to improve separation, this water may have dissolved in it about 5% by weight of sodium chloride. The oil stock, secondary butyl alcohol, and water or sodium chloride solution, after thorough mixing, are allowed to settle in a tank in which an upper layer of purified oil containing the mahogany sulfonate is formed, and a lower brine layer settles out containing the mentioned objectionable mineral salts and substantially all of the green acid soap.

The purified sulfonate-containing oil phase thus obtained may now be recovered as an oil stock for any desired purpose, the objectionable mineral salts, green acid sulfonate and the like having been adequately eliminated. The sodium mahogany sulfonate present therein may then be converted to a polyvalent metal sulfonate, such as a calcium sulfonate, as by the process presently to be described. However, preferably, the purified oil-sulfonate phase is further treated to reject a large proportion of the oil from the sulfonate, for example about 75% to 90% of the oil, whereby to yield a resultant soap-free oil which may be employed as a very desirable motor oil stock. This oil rejection is relatively easily effected by mixing with the oil-sulfonate phase a considerable proportion of fresh water to the point where equilibrium conditions are so changed that the water has a preferential affinity for the soap and such proportion of secondary butyl alcohol as accompanies the soap and water under these conditions. The amount of water introduced for this purpose of excess oil rejection may approximately equal that used in the purification stage to produce the brine layer containing the undesired inorganic salts and the green acid soaps; namely, 15% to 25% of the volume of the oil stock; or it may be more, or somewhat less, depending upon conditions and the amount of oil to be rejected. Under both of these conditions, the secondary butyl alcohol or other described organic liquid serves to prevent emulsion formation to break any emulsion which would otherwise form, so that the oil phase always separates readily without loss of sulfonate in the oil by entrainment in the oil phase. The oil rejection is in effect a soap concentration stage.

The water equilibrium relationships which control the rejection of brine without oil rejection in the purification stage, and the rejection of soap-free oil from a water-soap-oil phase in the concentration stage, apparently depend upon the presence of the inorganic or mineral salts which separate out in the brine of the purification stage, the alcohol content, the character of the stock, and kindred conditions. Apparently the inorganic salt content is an important factor and for that reason I prefer to employ a sodium chloride solution in the purification stage as herein indicated. Under such circumstances the desired sulfonates remain in the oil and no oil or mahogany sulfonate is brought down in the brine, whereas a considerable proportion of water is held in the oil by the desired sulfonate; namely, the mahogany sulfonate. When the oil-sulfonate-water phase from the purification stage (which is now free of mineral salts of the inorganic type and also free from the green acid soaps) is treated with water containing no significant proportion of inorganic salts in the presence of the secondary butyl alcohol, a stage is reached, as water is added, where the water has a preferential affinity for the mahogany sulfonates to an extent where soap-free oil is rejected from an underlying layer of an oil-soap-water solution. Both layers contain the emulsion-breaking alcohol in divided proportions. By increasing the proportion of water (or the proportion of water and alcohol) more oil may be rejected to a point where the sulfonate-water layer contains as little as about 30% of non-volatiles (oil and sulfonate). Thus, where about 25% of water containing about 5% of sodium chloride is used in the purification stage, about 25% to 30% of fresh water in the concentration stage will serve to reject as much as 85% of the 420 parts of oil given in the starting stock example. If only about half of the oil content is to be rejected in the concentration stage, this can be effected by reducing the added water.

The water content (including sodium chloride solution) in the purification step will ordinarily be in the order of about 15 parts to perhaps 30 or 35 parts of water per 100 parts of the combined soap-oil starting stock, and the water employed in the concentration stage will ordinarily be between about 15 parts to 50 parts of each 100 parts of the oil-sulfonate phase. If the alcohol contains any appreciable water content, this is included in calculating the total water content. The water content is thus several times greater than the content of the emulsion-breaking alcohol, and the content of the alcohol is usually less than the sulfonate content of the oil-sulfonate stock.

The rejected soap-free oil will be sent to a still to remove and recover the 1% to 2% of alcohol present, and will be filtered. Since the mahogany sulfonate in the water-soap-oil solution is a sodium sulfonate which it is ordinarily desired to convert into calcium sulfonate, or other alkaline earth metal sulfonate or polyvalent metal sulfonate, this water-soap-oil solution (which also contains emulsion-breaking alcohol) is commingled with an appropriate amount of water-soluble solution of the desired polyvalent metal, for example a 20% solution of calcium chloride, and conversion of the sodium sulfonate to calcium sulfonate is thereby effected. This mixture, in the presence of the emulsion-breaking liquid, is then allowed to settle for several hours. The brine which settles out is removed, and the calcium sulfonate-oil layer is sent to a still for removal of water and the emulsion-breaking liquid.

In order to provide a consistent control of the concentration of the sulfonate in the calcium sulfonate product just described, it has been found both easy and desirable to reject more oil in the oil rejection stage than is necessary, and then add back an appropriate amount of such oil, or a more desirable oil, at a later stage to regulate the soap concentration in the final product. Thus a portion of the rejected oil may be returned to the conversion stage, or to the converted product, without having been sent to the still to remove emulsion-breaking alcohol as previously indicated. The described calcium sulfonate-oil concentrate, after dehydration and filtering, constitutes a commercial product. It may for example contain 30 to 40 parts of soap and 70 to 60 parts of oil by weight.

The above-described stages of purifying the neutralized acid-treated sulfonate-oil stock, and of rejecting excess soap-free oil, and of converting the sodium mahogany sulfonate in the oil to a calcium mahogany sulfonate or other desired polyvalent metal mahogany sulfonate, including the settling steps, preferably are carried on at temperatures in the order of 140° F. to 150° F. This temperature range is adequately high to assure good separation of the brine phases, and it has the further advantage that separation of alcohol vapors during the various steps is small and lowers the burden on the alcohol recovery system. Of course, lower temperatures down to perhaps as low as 100° F. could be employed, but separation of the various phases is inconvenient and uneconomically slow.

Figure 2:
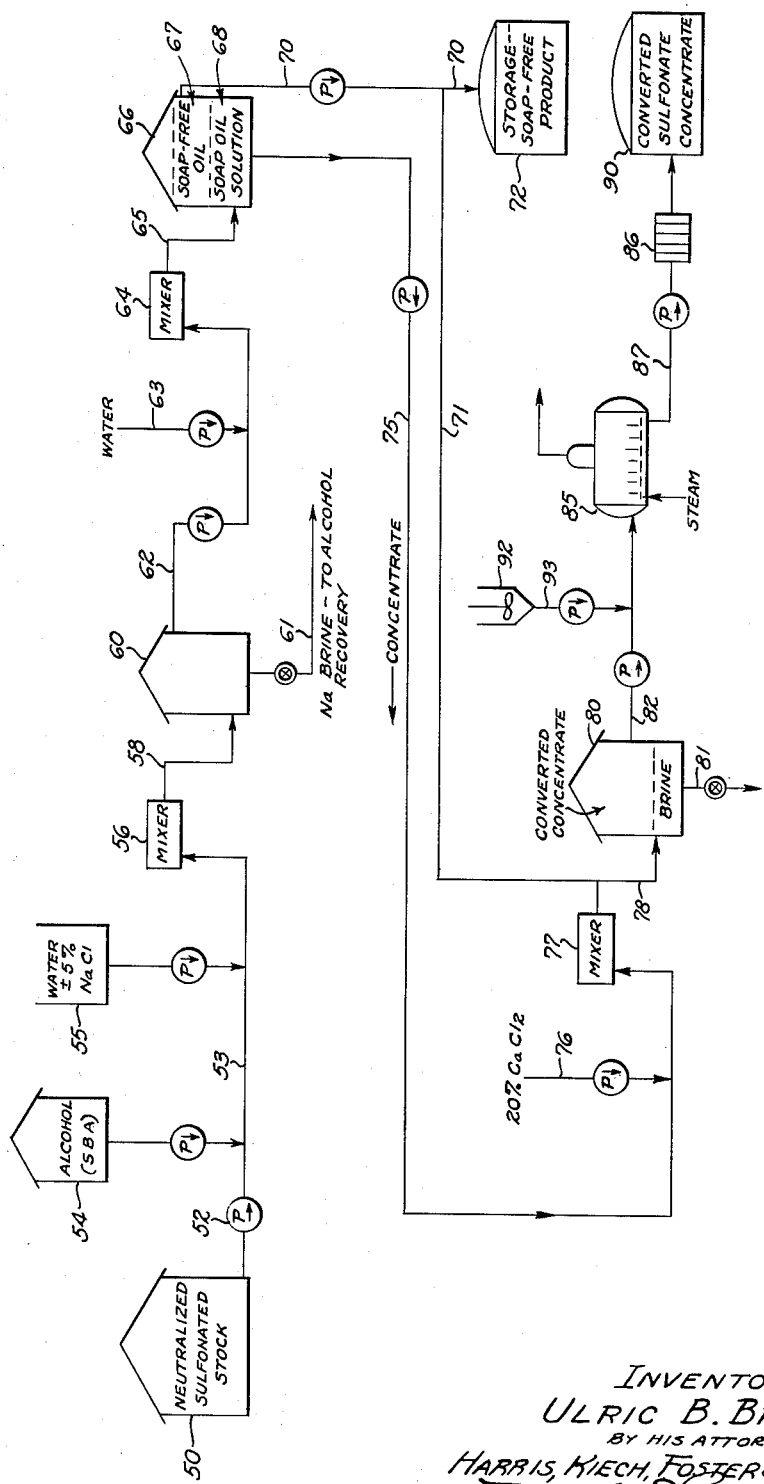
Figure 3:
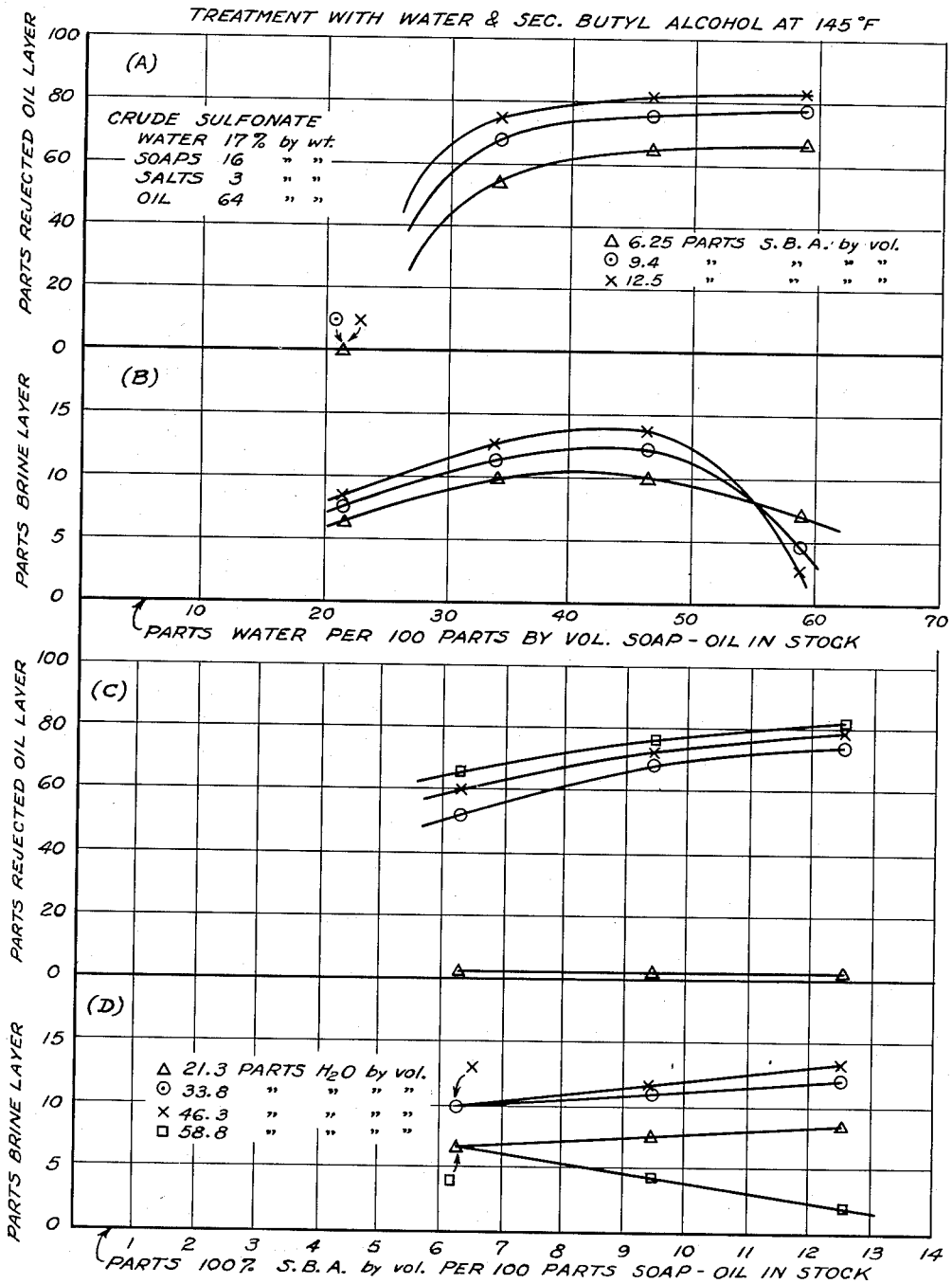

By way of further explanation, reference is made to the accompanying flow sheets illustrating the various steps above described. In the drawings, which include flow sheets:

Fig. 1 outlines the described improvement of sulfonating the required lubricating fraction and of settling out the resultant sludge in the presence of naphtha which is added immediately following sulfonation;

Fig. 1A illustrates an alternative for one step of the procedure of Fig. 1;

Fig. 2 illustrates the described improvement in purifying the acid-treated oil-sulfonate mixture and in converting sulfonates in the oil; and Fig. 3 presents curves showing various relationships among the various components for treatment with secondary butyl alcohol (S. B. A.) at temperatures of about 145° F.

As outlined in Fig. 1, an appropriate lubricating stock, such as a naphthenic raffinate of 25 V. I., 45 V. I., or 55 V. I., which may have been produced by any appropriate solvent extraction, light acid treatment, or the like, is drawn from a supply tank 10 and passed by a pump 11 through a line 12 into which there is pumped by way of a line 13 a properly calculated proportion of fuming sulfuric acid, preferably 106% $H_2SO_4$, carried in a supply tank 14. The mixture of acid and oil is preferably passed through a mixer 15 to insure proper reaction, whence it is conducted through a cooler 16 and into a line 18. Preferably 1% to 2% of water is pumped from a line 19 into the line 18 and the resultant mixture is then passed through a cooler 20 which discharges to a line 21. Immediately after the admixture of the acid and oil and the indicated addition of water with the incidental cooling, and before settling of any sludge, a quantity of naphtha, preferably of the aromatic type heretofore described, is passed from a naphtha supply tank 22 by way of a line 23 into the line 21. In practice the preferred equal volume of naphtha is based on the sum of the values of oil taken from the supply 10 and oleum taken from the supply 14. The acid-oil and naphtha mixture is passed from the line 21 into a mixer 24 in which thorough distribution of the naphtha in the oil is effected. The intimate mixture from the mixer 24 is then passed into a settling tank 25 in which, even though the operation is continuous, the acid sludge, including the fine pepper sludge and much of the green sulfonic acids completely settles out, so that it may be continuously withdrawn, by way of the sludge line 26, as indicated. Liberated sulfur dioxide may be withdrawn from the top of the tank as indicated.

The layer of sludge-free, acid-treated oil in the settling tank 25 is continuously withdrawn from an upper portion thereof by way of a line 27. If desired, secondary butyl alcohol or other emulsion breaking organic liquid, as heretofore described, may be introduced into the line 27 from a supply tank 28, rather than to be introduced later on in the process as hereinafter described. However, this is optional, and in a preferred operation the alcohol is added following the removal of the naphtha and neutralization of the oil.

The sludge-free acid oil in solution in the naphtha being passed through the line 27 receives a calculated amount of sodium hydroxide solution from a caustic storage tank 30, this solution being passed into the line 27 by a line 31. This mixture is then introduced into a mixer 32 to effect thorough commingling and complete neutralization of any contained sulfuric acid and the sulfonic acids, this intimate mixture being then fed into a settling tank 33 in which a water layer containing excess caustic and some salts readily separates for continuous withdrawal through a line 34. A neutralized, acid-treated, sludge-free oil layer continuously separates above the water layer in the settling tank 33 and is continuously withdrawn from the top thereof through a line 35.

By reason of the dilution of the acid oil with naphtha before sludge separation, as above described, all fine pepper sludge, which has heretofore been so difficult to eliminate, readily separates out in the settling tank 25. Similarly, upon neutralization of the acid oil with sodium hydroxide solution as described, a large portion of all sodium salts and other inorganic salts that are present, including sodium sulfite and sodium sulfate, are now removed in the tank 33 by way of the aqueous bottom layer which separates therein and is withdrawn therefrom by the line 34, as above described.

The neutralized acid-treated oil taken off from the top of the tank 33 by way of the line 35 is, of course, still in solution in the naphtha which was introduced from the tank 22, but is largely free from every other impurity. This sludge-free, neutralized oil removed by the line 35 is then passed to an appropriate storage tank 36, from which it may be removed for distillation of the naphtha therefrom. This is accomplished readily by passing the oil from the tank 36 by a pump 37 to a heater 38 whence it is pumped into a steam still 40 wherein the naphtha and water are driven overhead by way of a line 42 leading to a condenser 43 which discharges to a naphtha storage tank 44 having a water drain 45. A line 46 may connect this tank with the naphtha storage 22, or the two tanks may be the same.

The dry, naphtha-free oil stock which is taken from the bottom of the still 40 by way of a line 48 is transferred to a neutralized, acid-treated oil storage tank or supply tank 50, whence it is subsequently removed for separation and conversion of contained sulfonate.

As an alternative method for introducing the naphtha into the acid oil, it may sometimes be preferable to employ the system shown in Fig. 1A. Here, the naphtha supply from the tank 22 is divided so that only one half of it is passed from the line 23 into the line 21 and thence to the mixer 24. This oil and naphtha mixture from the mixer 24 is introduced into an intermediate portion of a vertical contact tower 25a which may be filled with conventional contact material such as the well known Raschig rings or the like. The other half of the naphtha supply is taken from the line 23 by a branch line 23a and pumped into the bottom of the tower 25a so that it rises countercurrently through the settling acid sludge. Here the separated sludge is withdrawn from the bottom of the tower 25a through a sludge line 26. The sludge-free oil in naphtha solution is then withdrawn from the top of the tower 25a by the line 27 and passed to neutralization with caustic solution as before.

The neutralized, acid-treated stock, from which the naphtha has been distilled and which has been accumulated in the previously mentioned tank 50 is next treated for separation of contained sulfonate and to eliminate impurities in the form of green acid sulfonates and any contained inorganic salts. This treatment is outlined in Fig. 2 of the drawings. Here lubricating oil stocks are recovered, one of which, for example, may be substantially free of sulfonates and one of which will contain preferably oil-soluble, water-insoluble mahogany sulfonate such as calcium mahogany sulfonate. According to this improvement, the neutralized, naphtha-free oil from the tank 50 is passed by way of a pump 52 to a line 53 into which there is pumped from a storage tank 54 an appropriate quantity of secondary butyl alcohol or other emulsion-breaking organic liquid as heretofore described. Into the line 53 there is preferably pumped from a storage tank 55 an appropriate quantity, as heretofore described, of 5% sodium chloride solution, or, if feasible, a corresponding quantity of relatively pure water such as city drinking water. This combined stream of neutralized oil, alcohol and water or sodium chloride solution is then pumped through a mixer 56 and passed by way of a line 58 into a settling tank 60.

In the settling tank 60, which may be carried at any appropriate temperature between about 140° F. and 180° F. (preferably the latter in a continuous process), a brine layer readily separates out from an overlying oil-sulfonate layer. The brine layer contains substantially all of the green acid soap and practically all of any remaining inorganic salts. The oil-sulfonate layer contains all of the mahogany sulfonates, most of the secondary butyl alcohol or other emulsion-breaking liquid, and some water.

The underlying brine layer in the tank 60, which layer also contains some of the alcohol or other emulsion-breaking liquid, is withdrawn from the bottom of the tank 60 through a line 61 and passed to the alcohol recovery system. The overlying oil sulfonate layer is withdrawn through a line 62 into which a required quantity of water as heretofore indicated, is pumped by way of a line 63, the combined stream being then passed to a mixer 64 which discharges the mixture through a line 65 to a separating tank 66 in which the oil rejection stage takes place. The extent of the oil rejection, as has been previously described, depends upon the proportion of water added and also upon the proportion of alcohol or other emulsion-breaking liquid present, the proportion of such emulsion-breaking liquid being somewhat increased at this stage if beneficial or desirable.

As a result of oil separation in the separating tank 66, a body of soap-free oil indicated at 67 accumulates in the upper portion of the tank, and an underlying body indicated at 68 is formed which contains all of the sodium mahogany soap in solution with the water, most of the alcohol and that proportion of the oil which has been retained. This underlying layer 68 is in the form of a true solution wherein the relatively large portion of soap acts as a common solvent.

The separated soap-free oil constituting the body 67 in the separating tank 66 is withdrawn through a line 70 and constitutes a desired motor oil stock of much value for lubricating internal combustion engines. The body of this soap-free oil, which is to be used for lubricating purposes, is withdrawn from the system, passed to a still for removal of the alcohol or other emulsion-breaking liquid contained therein and for removal of any minor proportions of water present. Upon filtration this oil is ready for commercial disposition. Should any of the oil removed through the line 70 be required for dilution of the soap-oil concentrate from the underlying layer 68 in the tank 66, this may be withdrawn from the line 70 through a line 71 for return to the system. The remainder of this oil is passed to storage 72.

The water and alcohol solution of soap and oil of the mentioned underlying layer 68, which is in effect a sulfonate concentrate in a relatively small proportion of oil, is withdrawn from the bottom of the separating tank 66 through a draw-off line 75, such withdrawal being continuous in a continuously operating system. The content of such a solution may be about as follows:

100 parts sulfonate
50 parts oil
100 parts water
25 parts secondary butyl alcohol
0.4 part sodium sulfate
0.4 part sodium chloride.

Such a solution is obtainable by the described process when starting with a neutralized acid-treated oil containing:

100 parts sulfonate
420 parts oil
10 parts inorganic salts
15 parts water, for example.

The above described solution in water and alcohol of sodium mahogany sulfonate and oil, being passed through the line 75, is now to be treated for conversion of the sodium sulfonate to calcium sulfonate, or other polyvalent metal sulfonate which is oil-soluble and water-insoluble. This conversion is effected by thoroughly commingling a water solution of calcium chloride, or other appropriate water-soluble polyvalent metal salt, with the oil-sulfonate solution passing through the line 75, as by pumping a 20% calcium chloride solution into the line 75 from a line 76, thorough admixture being then effected in a mixer 77 to which the line 75 leads. The resultant intimate admixture is then pumped through a line 78 into a settling tank 80 wherein separation occurs at a temperature between about 140° F. and 180° F., heat being applied in any appropriate manner to provide the desired temperature. As heretofore indicated, temperatures in the upper part of the range are preferred for continuous operation, temperatures in the lower part of the range being ordinarily used for batch operation. In the settling tank 80, a brine layer settles out in the bottom which contains any excess calcium chloride solution and resultant sodium chloride solution, together with part of the alcohol. This spent brine is withdrawn through a line 81 and passed to the alcohol recovery system. Above the brine layer in the tank 80 a layer of a concentrate of the converted calcium soap in oil with water and a part of the alcohol forms. This layer may contain for example 10% alcohol and 10% water. Oil which may have been required to dilute the converted soap-oil concentrate may have been introduced from the line 71 to the stream entering the concentrate settling tank 80, either by introduction into the line 78 following the mixer 77, as shown, or prior thereto either before or after introducing the calcium chloride solution. The calcium sulfonate-oil concentrate leaving the settling tank 80 is then passed by a line 82 to a steam still 85, or the like, for removal of the contained alcohol, or other emulsion-breaking liquid, and accompanying water, the alcohol being recovered for further use. The oil is dehydrated, passed to a filter 86 by way of a line 87, and accumulated in a storage vessel 90. If desired to increase the alkalinity of the product, a small proportion of calcium hydroxide in a slurry in oil or water may be introduced into the converted soap-oil mixture from an appropriate storage 92 by way of a line 93 ahead of the steam still 85.

In order to provide a consistent control of the concentration in the sulfonate-oil end product, it has been found both easy and desirable to reject more oil in the separating tank 66 than necessary for that operation, and then add back an appropriate amount of that oil, or any other desirable oil, at a later stage to regulate the soap concentration of the final product. This return has been indicated by the line 71. Such return, to adjust the concentration, may be made before, during, or after the conversion to the polyvalent metal sulfonate, as above stated.

Normally, in the conversion stage it might be expected that in view of past experiences, the calcium or other polyvalent metal sulfonates formed in such concentrated oil solution would result in the production of a very refractory water-in-oil emulsion. However, in conjunction with the described alcohol or other emulsion-breaking, oil-soluble, water-insoluble, organic liquid compounds above described, the phases break readily and separate sharply within a reasonable time varying with the temperature maintained. Apparently the function of the alcohol, or other indicated emulsion-breaking liquid, is not so much that of a selective solvent as that of breaking up an otherwise stable oil-continuous emulsion or preventing formation of such an emulsion. As to the motor lubricating grade of oil removed by the line 70, should this contain a very small amount of mahogany soap, such can be converted into calcium soap or other polyvalent metal soap with the same type of treatment as described for the oil-soap solution withdrawn through the line 75 from the bottom of the tank 66.

Referring to various aspects of the above-described treatment, in the purification step the dosages of water (or NaCl solution) and emulsion-breaking liquid are best selected with respect to each other. It is apparent from Fig. 3 that, for each alcohol dosage in the range of 5% to 15% based on the oil-soap content of the stock, there is an appropriate range of water content of the mix (the sum of both the water present in the stock and the water added) for any given alcohol content. This appropriate water content of the mix will usually be found in the range of 10% to 60% water based on the oil-soap content of the stock. Furthermore, in the appropriate water range for any given alcohol dosage, there will be a somewhat narrower preferred range of water content, as is to be expected from the fact that with water contents below and above the appropriate range, no brine phase is produced. For example, as indicated in Fig. 3, an alcohol dosage of 12.5% and a total water content of 21% gave about the same extraction of salts and other impurities (such as green acid soap) as an alcohol dosage of 6.25% and a total water content of 34%. In the first case the yield of brine layer was 8.5% as compared with 10.0% in the second, but the brine in the first case was more concentrated. (Other crude sulfonates will have somewhat different optimum ranges but the appropriate range will be found within the general order of magnitude indicated for the stock shown above.) While the extraction of impurities was about the same in the two cases, it will be noted that in the first case only a brine phase separated on settling, yielding two layers, whereas in the second case a rejected oil layer appeared on top of the concentrated and purified soap layer, along with the brine layer on the bottom, thereby yielding three layers. Sometimes it is preferable to avoid simultaneous rejection of oil along with the brine, as for example in one method of operating a continuous extraction column, but in the batch method, simultaneous separation of oil is of little consequence, and the dosages of alcohol and water are chosen to give the optimum extraction of salts and other water-soluble impurities regardless of simultaneous rejection of oil from the soap phase.

In the event sufficient oil is rejected under conditions of optimum extraction of water-soluble impurities, then subsequent rejection of oil is obviously unnecessary and the concentration step is therefore completed along with the purification. On the other hand, if the purification conditions chosen do not reject the desired proportion of oil, then the brine phase is removed and additional water is then added to bring up the total water used (including water originally in the stock) to the place on the curve where the desired amount of oil is rejected. Instead of adding water, more alcohol, or both alcohol and water, may be added to cause additional rejection of oil. If the purification and concentration are to be conducted separately, the brine settled in the purification step should be removed before any appreciable additional water or alcohol is added, lest the brine redissolve in the mix.

Often, it is desirable to have present at least enough alcohol to saturate or approximately saturate the water present, in order to get good separation. This is true especially where high volume ratios of water (such as higher than the indicated 60% of water based on the oil-sulfonate content) are used, inasmuch as such saturation provides a good means for alcohol control. Otherwise, good alcohol contents are found in the range of 10% to 50% of the total water content, or within a range of about 3% to 20% based on the oil-sulfonate content. The economically and operatively preferred range, if not the most efficient range, is from 5% to 15% of alcohol or other emulsion-breaking liquid, based on the oil-sulfonate content.

In the event the crude sulfonate as received contains too much water to give a brine phase upon the addition of the specified alcohol, the excess water is removed by evaporation substantially in toto or, if desired, until the amount remaining corresponds to the working range for the usual alcohol dosage of 5% to 15%. The evaporation may be by distillation or by heating and air blowing. In general the most satisfactory procedure is to remove most of the water and then add back the desired amount as the stock is processed in accordance with this invention.

I claim as my invention:

1. A method for producing hydrocarbon fractions including the steps of: preliminarily treating a hydrocarbon oil fraction of lubricating viscosity to remove readily polymerizable constituents and separating such constituents; subjecting the resultant lubricating oil fraction to the action of fuming sulfuric acid to effect sulfonation of remaining sulfonatable constituents and yield an oil-containing sulfuric acid and sulfonic acids; intimately commingling with such acid oil, before substantial separation of acid sludge therefrom, a small amount of water approximating 1% to 2% and then intercommingling therewith an approximately equal volume of largely aromatic naphtha having an end boiling point below about 300° F.; separating the acid sludge from the naphtha solution of said oil; treating the resultant naphtha-oil solution with an aqueous alkaline alkali-metal agent to neutralize such solution, and yield sulfonates dissolved in said oil-naphtha solution; separating from the resultant mixture an aqueous phase and accompanying salts contained in said aqueous phase; removing said naphtha from the oil-sulfonate phase; treating the alkali-metal sulfonate-in-oil solution with a soluble polyvalent metal salt in the presence of water and a relatively water-insoluble oil-soluble emulsion-breaking liquid solvent consisting of carbon, hydrogen and oxygen selected from the group consisting of alcohols, ethers, esters and ketones containing 4 to 8 carbons per molecule, to convert said alkali-metal sulfonates to polyvalent metal sulfonates dissolved in said oil and avoiding appreciable emulsification effects; and recovering the polyvalent metal sulfonates in solution in the oil.

2. A method as in claim 1 wherein the naphtha-oil solution following sludge separation is neutralized with sodium hydroxide.

3. A method as in claim 1 wherein the acid-oil mixture is cooled, before the addition of said naphtha, to a temperature below about 110° F.

4. In a method for producing petroleum products: preparing a petroleum fraction of lubricating viscosity range and largely free from readily polymerizable constituents; subjecting such fraction to the action of a small excess of fuming sulfuric acid to effect sulfonation of sulfonatable constituents while controlling the temperature within a range below about 135° F.; diluting the resultant acid oil with a small amount of water approximating 1% to 2% and then with largely aromatic naphtha before substantial separation of sludge from the oil has had an opportunity to develop, the volume of naphtha approximating the volume of the acid-oil fraction and being intimately mixed therewith; settling out the acid sludge from the naphtha-oil solution to eliminate substantially all fine pepper sludge and a large proportion of green sulfonic acids; neutralizing the resultant naphtha-oil solution and contained mahogany acids with an aqueous solution of an alkaline alkali-metal compound; recovering a substantially water-free neutralized oil-mahogany sulfonate phase; combining such oil-sulfonate phase with an oil-soluble, relatively water-insoluble, emulsion-breaking liquid alcohol consisting of carbon, hydrogen and oxygen and containing four to eight carbons per molecule, and also adding water, the water being present in the order of 15 parts to 35 parts per hundred parts of combined oil and sulfonate, the proportion of emulsion-breaking liquid being present in the order of 5 parts to 20 parts per hundred parts of combined oil and sulfonate to break out a water phase containing most of the inorganic salts and most of the green acid sulfonates, while leaving the mahogany sulfonate in solution in the oil-alcohol phase; removing such broken-out water phase; adding additional water to said sulfonate-oil-alcohol phase to change the affinity relationship of the oil for the sulfonate and reject a sulfonate-free oil phase from the remaining sulfonate-oil-alcohol-water phase; reacting the last named phase with a water-soluble polyvalent metal compound in water solution to convert the alkali-metal mahogany sulfonate to an oil-soluble, relatively water-insoluble, polyvalent metal sulfonate dissolved in said oil; separating a brine phase to yield an oil-sulfonate phase containing the polyvalent metal sulfonate; and removing the solvent and water content of said oil-sulfonate phase to yield a sulfonate concentrate in oil.

5. A method as in claim 4 wherein the water added to said oil-sulfonate at the time of addition of said emulsion-breaking alcohol contains in the order of 5% of sodium chloride to effect separation of the oil-sulfonate phase from the water phase.

6. A method as in claim 4 including the step of removing said naphtha at a stage later than neutralization of said oil-in-naphtha solution.

7. In a method for producing hydrocarbon products: subjecting a hydrocarbon fraction of lubricating viscosity to the action of fuming sulfuric acid in proportion to effect sulfonation of sulfonatable constituents; diluting the resultant sulfonated oil, before substantial sludge separation, with a relatively small amount of water and then with a relatively large volume of predominantly aromatic naphtha intimately mixed therewith to effect complete sludge separation; settling out the acid sludge from the oil-in-naphtha solution until substantially all pepper sludge has separated; neutralizing the sludge-free oil-in-naphtha solution to convert sulfonic acids to sulfonates and to neutralize any remaining sulfuric acid; recovering a mahogany sulfonate-in-oil phase; combining such sulfonate-in-oil phase with about 5 parts to 20 parts per 100 parts of combined sulfonate and oil, of an emulsion-breaking liquid alcohol which is oil-soluble and relatively water-insoluble and contains from four to about eight carbons per molecule; adding to the resultant mixture a quantity of water to break out an oil-free water phase and leave a mahogany sulfonate-oil phase substantially free from inorganic salts and green acid sulfonates; and recovering such salt-free mahogany sulfonic-oil phase.

8. A method as in claim 7 including the further steps of: adding additional water to said salt-free mahogany sulfonate-oil phase to cause a sulfonate-free oil phase to be rejected from a resultant alcohol-water-sulfonate-oil phase; and separately recovering the last two phases.

9. A method as in claim 8 including an additional step of treating said alcohol-water-sulfonate-oil phase with a polyvalent metal compound to convert the sulfonate therein to an oil-soluble water-insoluble sulfonate dissolved in said oil in the presence of said alcohol; removing a resultant separated water phase from a resultant sulfonate-oil phase; and removing said alcohol from such resultant sulfonate-oil phase.

10. A method as in claim 9 including the step of removing said naphtha at a stage later than neutralization of said oil-in-naphtha solution.

11. A method as in claim 7 wherein the water added to the solution of emulsion-breaking alcohol and oil is greater than the volume of emulsion-breaking alcohol and less than about 40 parts per 100 parts of the combined sulfonate and oil.

12. In a method of producing petroleum products: subjecting a petroleum fraction of lubricating viscosity, which has been treated to remove easily polymerizable constituents, to the action of fuming sulfuric acid to effect sulfonation of sulfonatable constituents; intimately mixing the resultant sulfonated, acidified oil, before substantial separation of acid sludge, with a relatively small amount of water approximately 1% to 2% and then with a volume of largely aromatic naphtha approximating the combined oil and acid content to effect substantially complete sludge separation; settling out acid sludge from the oil-naphtha solution until pepper sludge with accompanying green sulfonic acids has separated; recovering the sludge-free oil in naphtha solution and neutralizing the same to convert sulfonic acids to sulfonates and to neutralize the sulfuric acid; recovering a mahogany sulfonate-in-oil phase following neutralization; supplying in the sulfonate-oil phase at a stage following sludge separation from about 5 parts to 20 parts, per 100 parts of combined oil and sulfonate constituents, of an emulsion-breaking organic liquid diluent consisting of carbon, hydrogen and oxygen which is oil-soluble and relatively water-insoluble and contains from four to eight carbons per molecule and selected from the class consisting of alcohols, esters, ethers and ketones; supplying in the neutralized-oil-diluent-sulfonate phase a quantity of water sufficient to break out an oil-free water phase and leave a mahogany-sulfonate-oil phase substantially free from inorganic salts and green acid sulfonates; and recovering such salt-free mahogany-sulfonate-oil phase.

13. A method as in claim 12 including the further steps of: adding additional water to said salt-free mahogany sulfonate-oil phase to cause a sulfonate-free oil phase to be rejected from a resultant diluent-water-sulfonate-oil phase; and separately recovering the last two phases.

14. A method as in claim 13 including the further steps of: adding additional water to said salt-free mahogany sulfonate-oil phase to cause a sulfonate-free oil phase to be rejected from a resultant diluent-water-sulfonate-oil phase; and separately recovering the last two phases.

15. A method as in claim 14 including the step of removing said naphtha at a stage later than neutralization of said oil-in-naphtha solution.

16. A method including the steps of: subjecting a sulfonatable petroleum oil fraction, which has been treated to remove easily polymerizable constituents, to the action of a sulfonating acid to form mahogany sulfonic acids; intimately commingling the resultant sulfonated acid oil, before substantial sludge separation, with a relatively small amount of water and then with a predominately aromatic naphtha in quantity to effect substantially complete sludge separation; settling out acid sludge from the oil-naphtha solution until the pepper sludge has separated; recovering the sludge-free oil-naphtha solution; treating the acid oil with an alkali-metal alkaline solution to neutralize said sulfonating acid and to form alkali-metal sulfonates from said mahogany sulfonic acids and in the presence of an emulsion-breaking oil-soluble, relatively water-insoluble liquid organic compound selected from the class consisting of alcohols, esters, ethers and ketones containing four to eight carbons per molecule; recovering the resultant oil solution of said alkali-metal sulfonates; and treating said sulfonate-in-oil solution with a soluble polyvalent metal salt in the presence of said aromatic naphtha to convert said alkali metal sulfonates to polyvalent metal sulfonates dissolved in said oil.

17. In a method for producing hydrocarbon products: subjecting a hydrocarbon fraction of lubricating viscosity to the action of fuming sulfuric acid in proportion to effect sulfonation of sulfonatable constituents; diluting the resultant sulfonated oil, before substantial sludge separation, with a relatively small amount of water and then with a relatively large volume of predominantly aromatic naphtha intimately mixed therewith to effect complete sludge separation; settling out the acid sludge from the oil-in-naphtha solution until substantially all pepper sludge has separated; neutralizing the sludge-free oil-in-naphtha solution to convert sulfonic acids to sulfonates and to neutralize any remaining sulfuric acid; recovering a mahogany sulfonate-in-oil phase; combining such sulfonate-in-oil phase with about 5 parts to 20 parts, per 100 parts of combined sulfonate and oil, of a butyl alcohol; adding to the resultant mixture a quantity of water to break out an oil-free water phase and leave a mahogany sulfonate-oil phase substantially free from inorganic salts and green acid sulfonates; and recovering such salt-free mahogany sulfonate-oil phase.

References Cited in the file of this patent

UNITED STATES PATENTS

| | | |
|---|---|---|
| 1,871,942 | Arveson | Aug. 16, 1932 |
| 2,286,725 | Goodloe | June 16, 1942 |
| 2,361,476 | Higbee et al. | Oct. 31, 1944 |
| 2,406,763 | Griesinger | Sept. 3, 1946 |
| 2,411,819 | Amott | Nov. 26, 1946 |
| 2,413,311 | Cohen | Dec. 31, 1946 |
| 2,416,192 | Mertes | Feb. 18, 1947 |
| 2,453,690 | Bray | Nov. 16, 1948 |
| 2,514,733 | Vold et al. | July 11, 1950 |
| 2,523,582 | Mattson | Sept. 26, 1950 |
| 2,543,885 | Wilson | Mar. 6, 1951 |
| 2,578,657 | Anderson et al. | Dec. 18, 1951 |